US008645796B2

(12) United States Patent
Ambroladze et al.

(10) Patent No.: US 8,645,796 B2
(45) Date of Patent: Feb. 4, 2014

(54) DYNAMIC PIPELINE CACHE ERROR CORRECTION

(75) Inventors: Ekaterina M. Ambroladze, Fishkill, NY (US); Michael Fee, Cold Spring, NY (US); Edward T. Gerchman, Milford, PA (US); Arthur J. O'Neill, Jr., Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 12/822,437

(22) Filed: Jun. 24, 2010

(65) Prior Publication Data

US 2011/0320866 A1 Dec. 29, 2011

(51) Int. Cl.
*G11C 29/00* (2006.01)
(52) U.S. Cl.
USPC ............. 714/764; 714/6.1; 714/6.21; 714/42; 714/54; 714/746; 714/773; 711/155; 711/142; 711/135; 711/140; 711/143
(58) Field of Classification Search
None
See application file for complete search history.

(56) References Cited

U.S. PATENT DOCUMENTS

| | | | |
|---|---|---|---|
| 6,038,693 A * | 3/2000 | Zhang | 714/768 |
| 6,408,417 B1 | 6/2002 | Moudgal et al. | |
| 6,480,975 B1 * | 11/2002 | Arimilli et al. | 714/52 |
| 6,560,668 B2 | 5/2003 | Ryan et al. | |
| 6,625,756 B1 | 9/2003 | Grochowski et al. | |
| 6,708,294 B1 * | 3/2004 | Nakao et al. | 714/42 |
| 6,772,383 B1 * | 8/2004 | Quach et al. | 714/746 |
| 6,792,567 B2 | 9/2004 | Laurent | |
| 7,302,619 B1 * | 11/2007 | Tompkins et al. | 714/54 |
| 7,340,643 B2 | 3/2008 | Grochowski et al. | |
| 7,376,877 B2 * | 5/2008 | Quach et al. | 714/746 |
| 7,437,597 B1 * | 10/2008 | Kruckemyer et al. | 714/6.11 |
| 7,457,241 B2 | 11/2008 | Basso et al. | |
| 8,190,973 B2 * | 5/2012 | Penton et al. | 714/764 |
| 2005/0188249 A1 * | 8/2005 | Hart et al. | 714/5 |
| 2009/0024808 A1 * | 1/2009 | Hillier et al. | 711/155 |
| 2010/0083203 A1 * | 4/2010 | Bose et al. | 716/6 |
| 2010/0251017 A1 * | 9/2010 | Yamada et al. | 714/15 |
| 2011/0047408 A1 * | 2/2011 | Gille et al. | 714/6 |

FOREIGN PATENT DOCUMENTS

| | | |
|---|---|---|
| EP | 0730228 A1 | 9/1996 |
| EP | 2042996 A1 | 4/2009 |
| JP | 09054694 A | 2/1997 |

OTHER PUBLICATIONS

Dennis Abts et al., Architectual Support for Mitigating DRAM Soft Errors in Large-Scale Supercomputers, IEEE, Apr. 3, 2007, pp. 1-5, Texas, USA.*

* cited by examiner

*Primary Examiner* — John Trimmings
(74) *Attorney, Agent, or Firm* — Cantor Colburn LLP; John Campbell

(57) ABSTRACT

Dynamic pipeline cache error correction includes receiving a request to perform an operation that requires a storage cache slot, the storage cache slot residing in a cache. The dynamic pipeline cache error correction also includes accessing the storage cache slot, determining a cache hit for the storage cache slot, identifying and correcting any correctable soft errors associated with the storage cache slot. The dynamic cache error correction further includes updating the cache with results of corrected data.

20 Claims, 5 Drawing Sheets

DYNAMIC PIPELINE CACHE ERROR CORRECTION

BACKGROUND

Exemplary embodiments relate generally to cache storage systems, and more particularly to dynamic pipeline cache error correction.

Technology advancements that allow larger and denser storage caches (e.g., static dynamic random access memory (SRAM) and embedded dynamic random access memory (eDRAM)) on a single chip are known to result in an increased number of soft errors. Soft errors refer to errors in a computer system which are not caused by a defect in design or manufacture. In other words, soft errors are errors that, if corrected, will go away, whereas defects in manufacturing or design will remain. These soft errors can be detected and corrected with error correction code (ECC) algorithms; however, because in many systems, it may be difficult to determine whether an error is present or to determine the correct data (e.g., after the system fails) the soft error goes undetected until the data is moved out of the cache during the correction process.

One known solution is to detect the error during array access pipe pass. This solution loads an engine that casts out a line of the cache in order to clean up the erroneous cache slot. However, as the number of soft errors increases, the number of unnecessary movement of data out of the cache increases also.

BRIEF SUMMARY

An embodiment is a computer program product for implementing dynamic pipeline cache error correction. The computer program product includes a tangible storage medium readable by a processing circuit and storing instructions for execution by the processing circuit for performing a method. The method includes receiving a request to perform an operation that requires a storage cache slot, the storage cache slot residing in a cache. The method also includes accessing the storage cache slot, determining a cache hit for the storage cache slot, and identifying and correcting any correctable soft errors associated with the storage cache slot. The method also includes updating the cache with results of corrected data.

An embodiment also includes a system for implementing dynamic pipeline cache error correction. The system includes a central processor and logic configured for execution on the central processor. The logic implements a method. The method includes receiving a request to perform an operation that requires a storage cache slot, the storage cache slot residing in a cache. The method also includes accessing the storage cache slot, determining a cache hit for the storage cache slot, identifying and correcting any correctable soft errors associated with the storage cache slot. The method also includes updating the cache with results of corrected data.

A further embodiment is a computer-implemented method for implementing dynamic pipeline cache error injection. The method includes receiving a request to perform an operation that requires a storage cache slot, the storage cache slot residing in a cache. The method also includes accessing the storage cache slot determining a cache hit for the storage cache slot, identifying and correcting any correctable soft errors associated with the storage cache slot. The method also includes updating the cache with results of corrected data.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Exemplary embodiments provide a mechanism for providing dynamic pipeline cache error correction (also referred to herein as "cache error correction"). The exemplary cache error correction processes provide a read-modify-write pipeline which detects soft errors in cache slots during the read out part of the pipeline. The data is then corrected and stored back into the slots during the write part of the pipeline. An advantage of this approach is that the corrected data is kept inside the cache and is not cast out to higher levels of cache. The error detection occurs when the slot is accessed, which indicates that an operation needs that data. As the cache error correction processes do not cast out the data to higher levels of cache, increased performance can be realized since there is no need to refetch the data from the higher-level cache by a future operation. This solution also enables the key cache to maintain optimum performance during tests that have a history of increased soft error occurrences, such as acceleration stress and temperature fluctuation tests.

Figure 1:
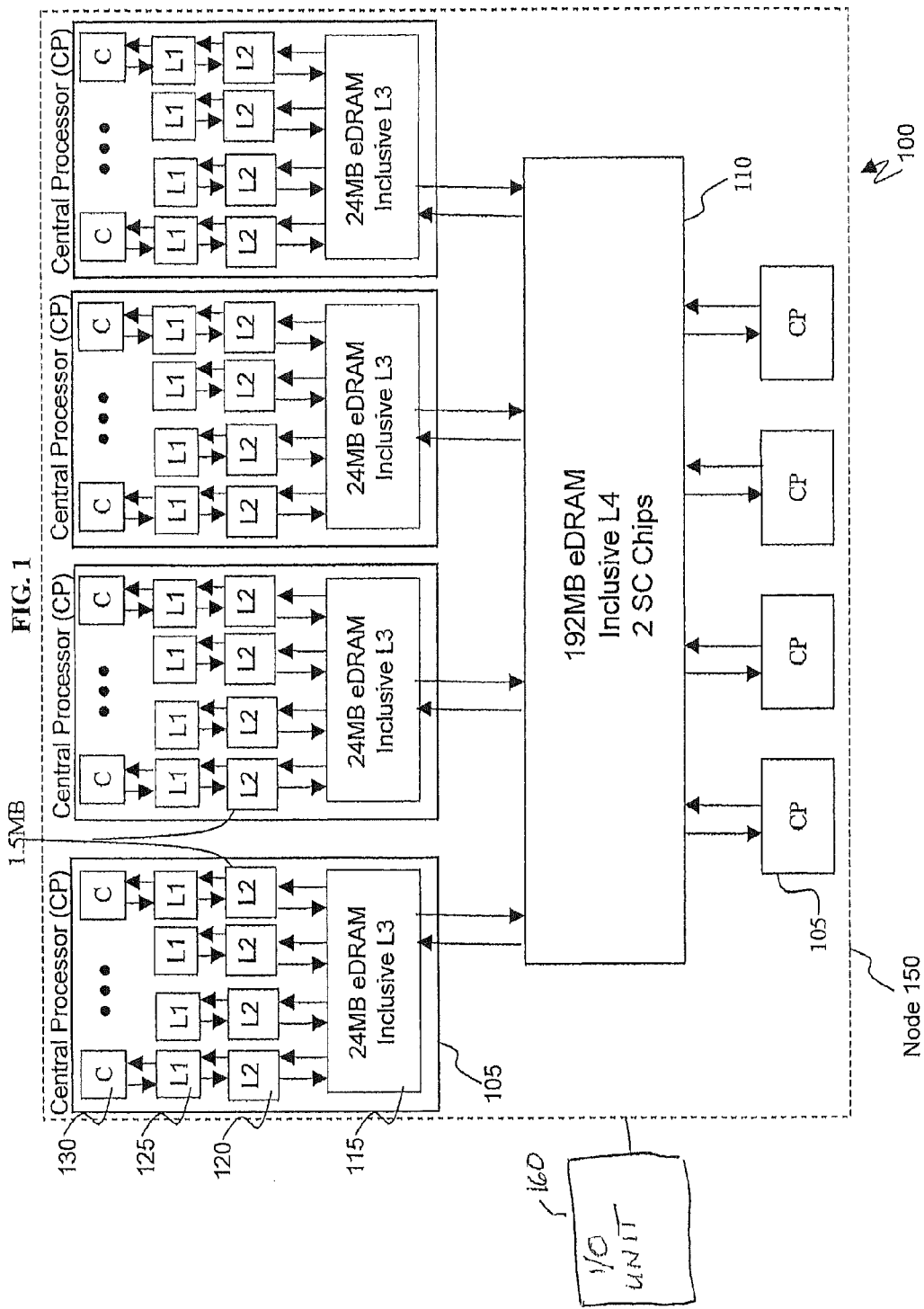
FIG. 1 depicts a system including a cache topology upon which dynamic pipeline cache error correction may be implemented in an exemplary embodiment.

Turning now to FIG. 1, a system 100 (including cache topology) for implementing the cache error correction processes will now be described in an exemplary embodiment. The system of FIG. 1 illustrates a plurality of central processors (CP) 105 (also referred to as central processing units) operatively connected via busses to one or more L4 caches 110. Although not shown in FIG. 1, each of the central processors (CP) 105 includes one or more cores 130 which perform the reading and executing of instructions. On each central processor (CP) 105, the multiple cores 130 are operatively connected via busses to L1, L2, and L3 caches 125, 120, and 115. The L1 caches 125 are physically closest to the cores 130, followed by the L2 caches 120, and then the L3 caches 115. It is understood that the designation of caches could be reversed.

Figure 2:
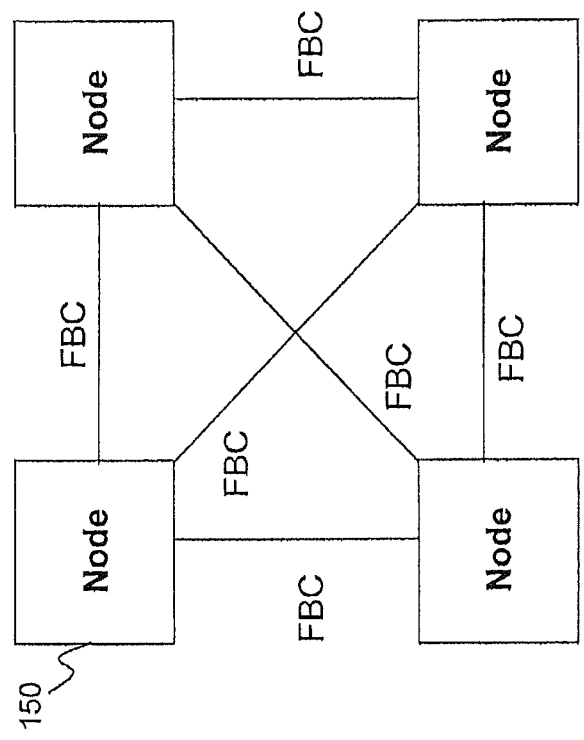
FIG. 2 depicts an example of a node-to-node fabric topology that may be used in implementing dynamic pipeline cache error correction in accordance with an exemplary embodiment.

Also shown in the system 100 is an L4 cache 110. The L4 cache 110 is operatively coupled to the CPs 105 and provides a shared memory space for each of the CPs 105. Although the L3 and L4 caches 115 and 110 are illustrated in FIG. 1 as embedded dynamic random access memory (DRAM), which is referred to as eDRAM, it will be understood by a skilled artisan that any other types of suitable memory may be utilized in realizing the exemplary embodiments. The central processors 105 operatively connected to one or more L4 caches 110 collectively form a node 150. In a computing system, multiple such nodes 150 may be operatively connected to one another for communicating, such as broadcasts, snooping, cache intervention, and responses. FIG. 2 illustrates an example of multiple nodes 150 operatively connected to one another via, e.g., one or more point-to-point buses, referred to herein as a system fabric.

The system 100 is communicatively coupled to an input/output (I/O) unit 160. The I/O unit 160 may include, e.g., an I/O hub, adapters, and interface elements for performing various operations in connection with the central processors 105.

The system 100 further includes various components for implementing the cache error correction processes described herein. These various components are described further in FIG. 3.

Each individual central processor 105 is fabricated on its own separate chip, which includes the L1, L2, and L3 caches 125, 120, and 115, while the L4 cache 110 is fabricated on its own separate chip. As understood by a skilled artisan, fabrication of chips including integrated circuits, wires, metal layers, semiconductor (and/or other material) components, etc., may be formed via lithography and other techniques. The fabrication process may include various deposition techniques including physical vapor deposition (PVD), chemical vapor deposition (CVD), electrochemical deposition (ECD), molecular beam epitaxy (MBE), and atomic layer deposition (ALD) among others.

Figure 3:
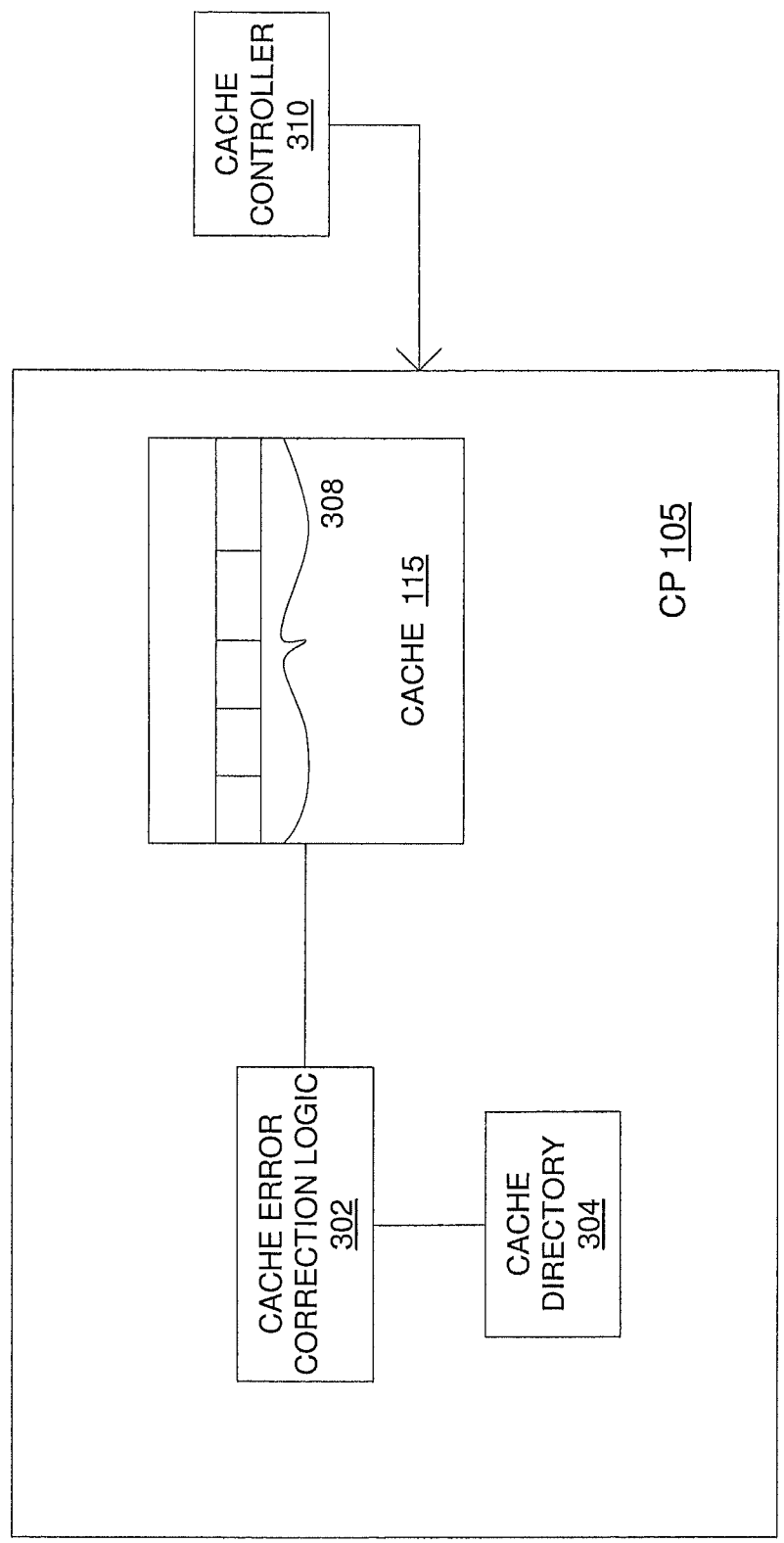
FIG. 3 depicts a detailed portion of the system of FIG. 1 upon which dynamic pipeline cache error correction may be implemented in an exemplary embodiment.

Turning now to FIG. 3, a detailed portion of the system 100 of FIG. 1 will now be described in an exemplary embodiment. As shown in FIG. 3 each central processor 105 may include cache error correction logic 302 in communication with a key cache directory 304, a cache (e.g., cache 115), and a cache controller 310. The cache error correction logic 302 is configured with the capability to determine whether bits in the directory 304 or cache 115 have flipped erroneously. The cache error correction logic 302 is also configured to correct the data when a bit has flipped. The cache 115 includes cache slots 308, which hold data subject to various operations initiated via the cache controller 310. The cache error correction logic 302 is implemented by the central processor 105 for performing the exemplary cache error correction functions.

Figure 4:
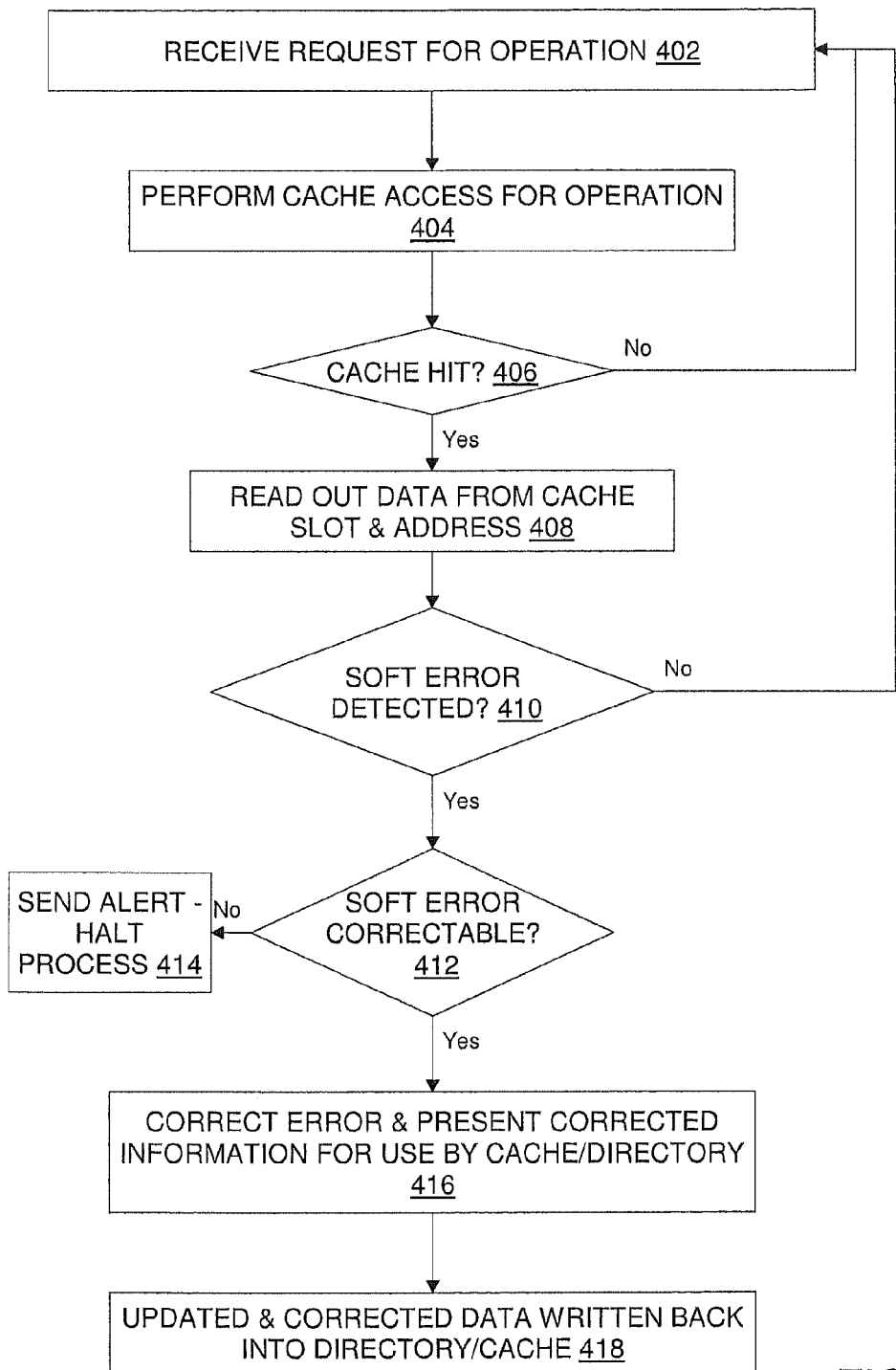
FIG. 4 is a flow diagram describing a process for implementing dynamic pipeline cache error correction in an exemplary embodiment.
Figure 5:
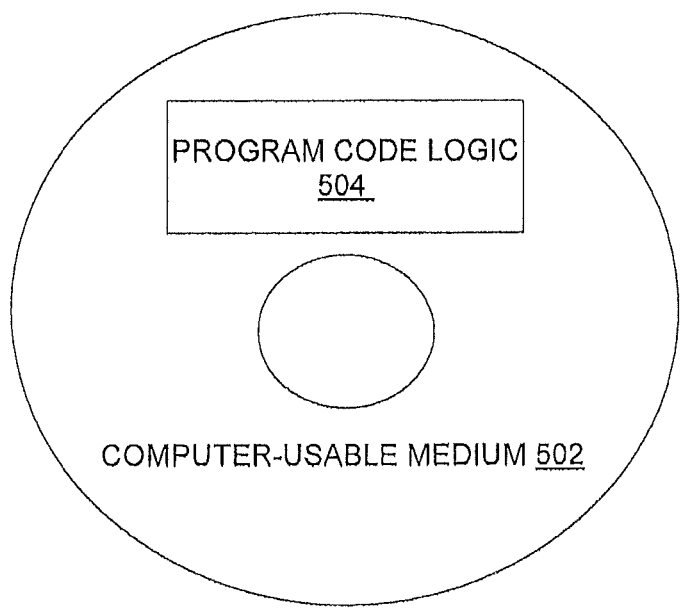
FIG. 5 is a computer program product in an exemplary embodiment.

Turning now to FIG. 4, an exemplary process for implementing cache error correction processes will now be described in an exemplary embodiment. For illustrative purposes, the processes described in FIG. 4 use operations from the cache controller 310, and the cache error correction logic 302 performs provides data protection on the key cache directory 304 and the cache 115. For illustrative purposes, the key cache directory 304 may be an SRAM system and the cache 306 may be an eDRAM system. However, it will be understood that the cache directory 304 and cache 306 may be implemented by other types of storage. In one embodiment, cache directory 304 may be an eDRAM and cache 306 may be an SRAM, or they may both be an SRAM or eDRAM).

An operation is received at a CP 105 from the cache controller 310 at block 402. The CP 105 simultaneously performs a cache access operation for both the key cache directory 304 and the cache 115 at block 404. The cache access is performed to obtain results of data and address look ups. Cache access is a request that initiates a read of the directory 304 and cache 115 at the same time to determine if the data of the request's address exists in the cache 115 and, if so, which slot the data is in. Upon determining the slot, that slot's corresponding data is selected to come out of the cache 115.

At block 406, it is determined whether a cache hit has occurred in cache 115 resulting from the operation's cache access. If the cache access operation does not result in a cache hit, then this means that there is no data in the cache slot (e.g., one of slots 308) to examine for errors. In this event, the process returns to block 402, whereby the CP 105 receives another operation from the cache controller 310. In an alternative embodiment, if the cache access operation does not result in a cache hit, another engine may be loaded if it is determined that any of the errors have occurred in the directory for the same index (and in any slot). In this instance, a read-correct-write operation is requested to that slot in the directory.

If, however, a cache hit has occurred in block 406, this means that there is data in the cache slot associated with the cache access operation. In this instance, both directory 304 and cache 115 slots data is read out for updating at block 408.

At block 410, the cache error correction logic 302 examines the data and determines whether any soft errors (e.g., flipped bits) have occurred. This may be implemented using various techniques, such as an error code correction (ECC) algorithm. If one or more soft errors have occurred, the cache error correction logic 302 determines whether they are correctable. For a correctable error, a single bit has been flipped, which is fixable. By contrast, an uncorrectable error is one in which multiple bits have flipped inside the cache since it was last updated.

If the soft errors are determined not to be correctable at block 412, then the system is alerted and stops the process at block 414, since it cannot guarantee the address or validity of the cache slot. If the error is in the data itself, the data may be marked as unusable and the data is marked as 'do not use.' If, however, the soft errors are determined to be correctable, the cache error correction logic 302 corrects the soft errors and presents the correction information for use with hit results (e.g., SRAM data) or for updating the data inside the cache 115 (e.g., eDRAMs) at block 416. The corrected data from the directory is used to figure out if the data exists for the address for which the request came in. Instead of using the data from the directory that is bad, the data is corrected and used. The same applies for cache as well (e.g., the data is corrected before it is returned to the requestor). At block 418, the updated and corrected data is written back into the directory 304 and cache 306. The process then returns to step 402 in which the next operation is received from the cache controller 310.

In a further exemplary embodiment, all directory cache arrays (e.g., SRAM arrays) in the key cache directory 304 are read out at the same time to determine if the operation hit in the cache 115. The cache error correction logic 302 is performed on all of the arrays in parallel so if there is no error in the hit cache slot (e.g., 308), other arrays will report an error to, e.g., an error reporting station (not shown) with index and slot number. This error reporting station will then perform a refresh operation (also referred to as read-correct-write) targeting the erroneous slot to correct the data through the solution as described above in FIG. 4.

Technical effects include providing dynamic pipeline cache error correction through a read-modify-write pipeline which detects soft errors in cache cache slots during the read out part of the pipeline. The data is then corrected and stored back into the slots during the write part of the pipeline. An advantage of this approach is that the corrected data is kept inside the cache and is not cast out to memory. The error detection occurs when the slot is accessed, which indicates that an operation needs that data. As the cache error correction processes do not cast out the data to memory, increased performance can be realized since there is no need to refetch the data from the memory by a future operation. This solution also enables the key cache to maintain optimum performance during tests that have a history of increased soft error occurrences, such as acceleration stress and temperature fluctuation tests.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product 500 embodied in one or more computer readable medium(s) 502 having computer readable program code embodied thereon 504.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for implementing dynamic pipeline cache error correction, comprising:
   a tangible storage medium readable by a processing circuit and storing instructions for execution by the processing circuit for performing a method comprising:
   receiving a request to perform an operation by a read-modify-write pipeline that requires a cache slot, the cache slot residing in a cache, the cache associated with a cache directory;
   simultaneously accessing, by a read part of the read-modify-write pipeline, a cache slot of the cache and a directory entry associated with the cache, the directory entry located in the cache directory;
   determining a cache hit for the cache slot based on the simultaneous accessing of the cache and the directory entry associated with the cache, and, based on determining the cache hit:
   correcting any correctable soft errors associated with the cache slot and the directory entry to produce corrected cache data or corrected directory data;
   updating, by a write part of the read-modify-write pipeline, the directory entry with the corrected directory data; and
   based on the corrected cache data being associated with the cache slot, updating, by the write part of the read-modify-write pipeline, the cache slot with the corrected cache data; and
   based on determining a cache miss for the cache slot based on the simultaneous accessing of the cache and the directory entry associated with the cache:
   determining whether an error has occurred in the cache directory in a same index as the directory entry and in a second cache slot; and
   based on determining that an error has occurred in the cache directory in the same index, issuing a read-correct-write operation to the second cache slot corresponding to the same index in which the error occurred.

2. The computer program product of claim 1, wherein the soft error is an erroneously flipped bit in the cache slot or the directory entry.

3. The computer program product of claim 1, wherein the cache is an embedded dynamic random access memory cache and the cache directory is a static random access memory cache.

4. The computer program product of claim 1, the method further comprising:
   based on accessing the cache directory simultaneously with the accessing of the cache:
   determining that data identified for an address of the request exists in the cache;
   based on determining that data exists for the address of the request in the cache, determining a cache slot in which the data is located; and
   determining the cache hit based on determination of the cache slot in which the data is located.

5. The computer program product of claim 1, further comprising based on determining the cache miss for the cache slot, accessing a next cache slot in the cache.

6. The computer program product of claim 1, further comprising based on determining the error is not correctable, marking the data as 'do not use.'

7. The computer program product of claim 1, further comprising, based on determining the cache hit:
   determining that no error has occurred in the cache slot and the directory entry;
   reading out all arrays in the directory;
   determining whether an error has occurred in a second cache slot based on the reading out all arrays in the directory; and
   based on determining that the error has occurred in the second cache slot, issuing a read-correct-write operation to the second cache slot in which the error occurred.

8. A system for implementing dynamic pipeline cache error correction, the system comprising:
   a central processing unit; and
   logic configured for execution on the central processing unit, the logic configured to implement a method, the method comprising:
   receiving a request to perform an operation by a read-modify-write pipeline that requires a cache slot, the cache slot residing in a cache, the cache associated with a cache directory;
   simultaneously accessing, by a read part of the read-modify-write pipeline, a cache slot of the cache and a directory entry associated with the cache, the directory entry located in the cache directory;
   determining a cache hit for the cache slot based on the simultaneous accessing of the cache and the directory entry associated with the cache, and, based on determining the cache hit:
   correcting any correctable soft errors associated with the cache slot and the directory entry to produce corrected cache data or corrected directory data;
   updating, by a write part of the read-modify-write pipeline, the directory entry with the corrected directory data; and
   based on the corrected cache data being associated with the cache slot, updating, by the write part of the read-modify-write pipeline, the cache slot with the corrected cache data; and
   based on determining a cache miss for the cache slot based on the simultaneous accessing of the cache and the directory entry associated with the cache:
   determining whether an error has occurred in the cache directory in a same index as the directory entry and in a second cache slot; and
   based on determining that an error has occurred in the cache directory in the same index, issuing a read-correct-write operation to the second cache slot corresponding to the same index in which the error occurred.

9. The system of claim 8, wherein the soft error is an erroneously flipped bit in the cache slot or the directory entry.

10. The system of claim 8, wherein the cache is an embedded dynamic random access memory cache and the cache directory is a static random access memory cache.

11. The system of claim 8, the method further comprising:
based on accessing the cache directory simultaneously with the accessing of the cache:
    determining that data identified for an address of the request exists in the cache;
    based on determining that data exists for the address of the request in the cache, determining a cache slot in which the data is located; and
    determining the cache hit based on determination of the cache slot in which the data is located.

12. The system of claim 8, further comprising based on determining a cache miss for the cache slot, accessing a next cache slot in the cache.

13. The system of claim 8, further comprising based on determining the error is not correctable, marking the data as 'do not use.'

14. The system of claim 8, further comprising, based on determining the cache hit:
    determining that no error has occurred in the cache slot and the directory entry;
    reading out all arrays in the directory;
    determining whether an error has occurred in a second cache slot based on the reading out all arrays in the directory; and
    based on determining that the error has occurred in the second cache slot, issuing a read-correct-write operation to the second cache slot in which the error occurred.

15. A computer-implemented method for implementing dynamic pipeline cache error correction, the method comprising:
    receiving a request to perform an operation by a read-modify-write pipeline that requires a cache slot, the cache slot residing in a cache, the cache associated with a cache directory;
    simultaneously accessing, by a read part of the read-modify-write pipeline, a cache slot of the cache and a directory entry associated with the cache, the directory entry located in the cache directory;
    determining a cache hit for the cache slot based on the simultaneous accessing of the cache and the directory entry associated with the cache, and, based on determining the cache hit:
        correcting any correctable soft errors associated with the cache slot and the directory entry to produce corrected cache data or corrected directory data;
        updating, by a write part of the read-modify-write pipeline, the directory entry with the corrected directory data; and
        based on the corrected cache data being associated with the cache slot, updating, by the write part of the read-modify-write pipeline, the cache slot with the corrected cache data; and
    based on determining a cache miss for the cache slot based on the simultaneous accessing of the cache and the directory entry associated with the cache:
        determining whether an error has occurred in the cache directory in a same index as the directory entry and in a second cache slot; and
        based on determining that an error has occurred in the cache directory in the same index, issuing a read-correct-write operation to the second cache slot corresponding to the same index in which the error occurred.

16. The computer-implemented method of claim 15, wherein the soft error is an erroneously flipped bit in the cache slot or the directory entry.

17. The computer-implemented method of claim 15, wherein the cache is an embedded dynamic random access memory cache and the cache directory is a static random access memory cache.

18. The computer-implemented method of claim 15, the method further comprising:
    based on accessing the cache directory simultaneously with the accessing of the cache:
        determining that data identified for an address of the request exists in the cache;
        based on determining that data exists for the address of the request in the cache, determining a cache slot in which the data is located; and
        determining the cache hit based on determination of the cache slot in which the data is located.

19. The computer-implemented method of claim 15, further comprising based on determining a cache miss for the cache slot, accessing a next cache slot in the cache.

20. The computer-implemented method of claim 15, further comprising, based on determining the cache hit:
    determining that no error has occurred in the cache slot and the directory entry;
    reading out all arrays in the directory;
    determining whether an error has occurred in a second cache slot based on the reading out all arrays in the directory; and
    based on determining that the error has occurred in the second cache slot, issuing a read-correct-write operation to the second cache slot in which the error occurred.

* * * * *